US011035437B2

(12) United States Patent
Boyd

(10) Patent No.: US 11,035,437 B2
(45) Date of Patent: Jun. 15, 2021

(54) SHACKLE CLAMP ASSEMBLY

(71) Applicant: Anthony Ray Boyd, New Iberia, LA (US)

(72) Inventor: Anthony Ray Boyd, New Iberia, LA (US)

( * ) Notice: Subject to any disclaimer, the term of this patent is extended or adjusted under 35 U.S.C. 154(b) by 47 days.

(21) Appl. No.: 16/690,823

(22) Filed: Nov. 21, 2019

(65) Prior Publication Data

US 2020/0339390 A1     Oct. 29, 2020

Related U.S. Application Data

(60) Provisional application No. 62/839,232, filed on Apr. 26, 2019.

(51) Int. Cl.
| | |
|---|---|
| *F16G 15/06* | (2006.01) |
| *F16B 21/12* | (2006.01) |
| *B66C 1/36* | (2006.01) |
| *B66C 1/64* | (2006.01) |

(52) U.S. Cl.
CPC ............... *F16G 15/06* (2013.01); *B66C 1/36* (2013.01); *B66C 1/64* (2013.01); *F16B 21/12* (2013.01)

(58) Field of Classification Search
CPC . F16G 15/04; F16G 15/06; B66C 1/36; B66C 1/66; F16B 21/12; Y10T 403/598; B62C 11/02
USPC ................................................. 59/86; 278/96
See application file for complete search history.

(56) References Cited

U.S. PATENT DOCUMENTS

| | | | |
|---|---|---|---|
| 620,914 A | 3/1899 | Griffith | |
| 1,095,859 A * | 5/1914 | Havens | F16G 15/06 |
| | | | 278/96 |
| 1,392,138 A * | 9/1921 | Freeman | B62C 11/02 |
| | | | 278/96 |
| 1,751,309 A | 3/1930 | De Mone | |
| 3,433,118 A * | 3/1969 | Ward | F16B 21/12 |
| | | | 411/340 |
| 3,462,945 A | 8/1969 | Barber | |
| 4,221,252 A * | 9/1980 | Bruce | F16B 39/04 |
| | | | 403/155 |
| 4,307,567 A | 12/1981 | Archer | |
| 4,423,610 A | 1/1984 | Hart et al. | |
| 4,840,528 A * | 6/1989 | Doom | F16B 21/12 |
| | | | 411/340 |
| 5,395,018 A | 3/1995 | Studdiford | |
| 5,460,418 A * | 10/1995 | Falls | F16G 15/06 |
| | | | 292/329 |

(Continued)

OTHER PUBLICATIONS

International Search Report and Written Opinion dated Feb. 11, 2020, from Applicant's counterpart International Patent Application No. PCT/US2019/62657.

*Primary Examiner* — Dean J Kramer
(74) *Attorney, Agent, or Firm* — Jones Walker LLP

(57) ABSTRACT

A shackle clamp assembly has one end configured as a cap for insertion on the end of a shackle bolt attached to a U-shaped shackle and second end configured as a loop for attachment around the U-shaped shackle. The cap has an aperture that aligns with a through-bore in the end of the shackle bolt. A pin is inserted through the aperture of the cap and the through-bore of the shackle bolt to retain the cap on the end of the shackle bolt. The cap abuts the nut threaded on the end of the shackle bolt to ensure that the nut does not become disconnected from the shackle bolt.

20 Claims, 11 Drawing Sheets

(56) References Cited

U.S. PATENT DOCUMENTS

| | | |
|---|---|---|
| 7,614,209 B1 | 11/2009 | Payne et al. |
| 9,890,831 B1 * | 2/2018 | Flesch |
| 10,054,146 B1 * | 8/2018 | Turner ................. F16B 21/125 |
| 2011/0175383 A1 | 7/2011 | Segura |
| 2013/0067881 A1 | 3/2013 | Khrakovsky et al. |

* cited by examiner

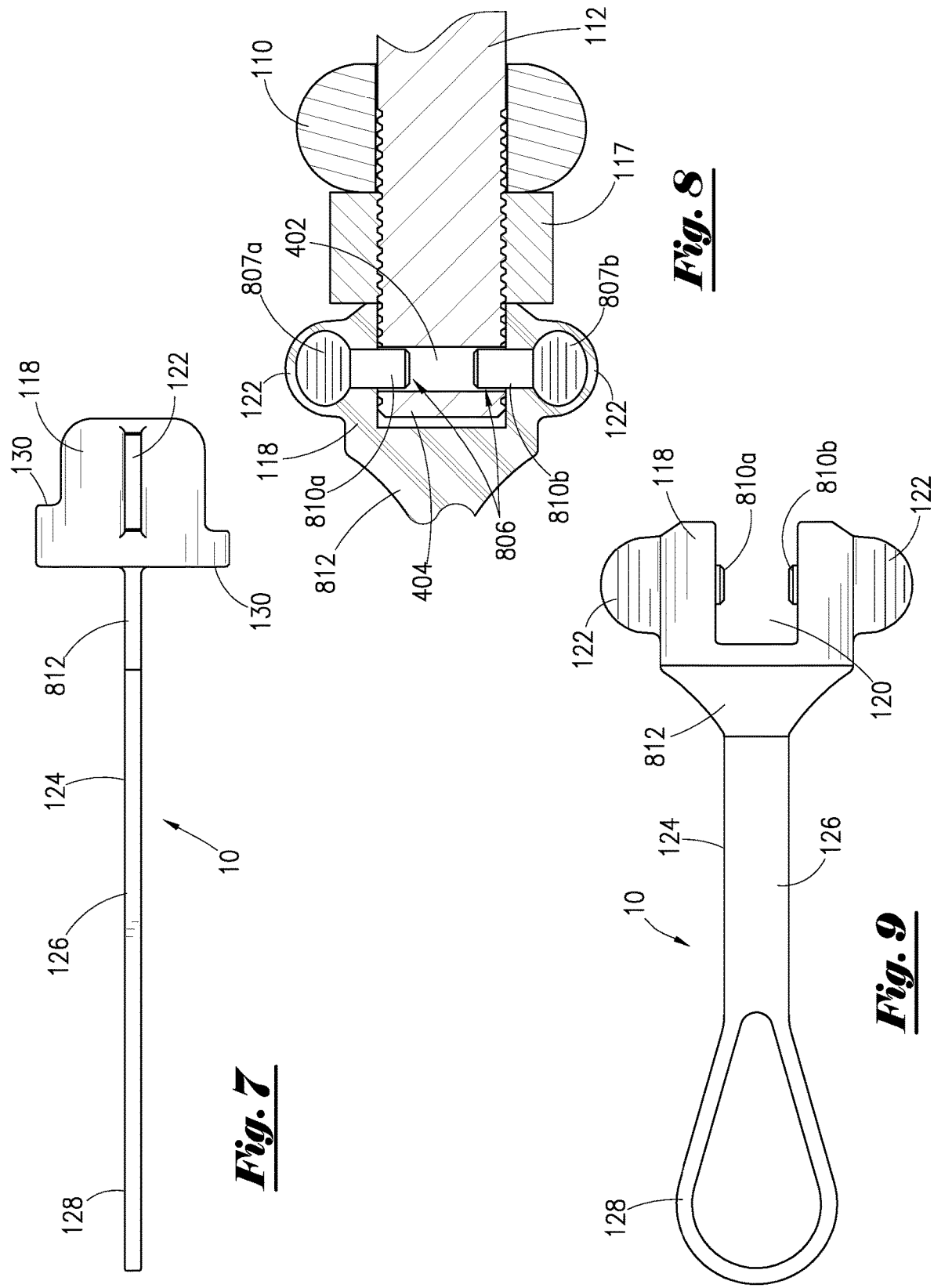

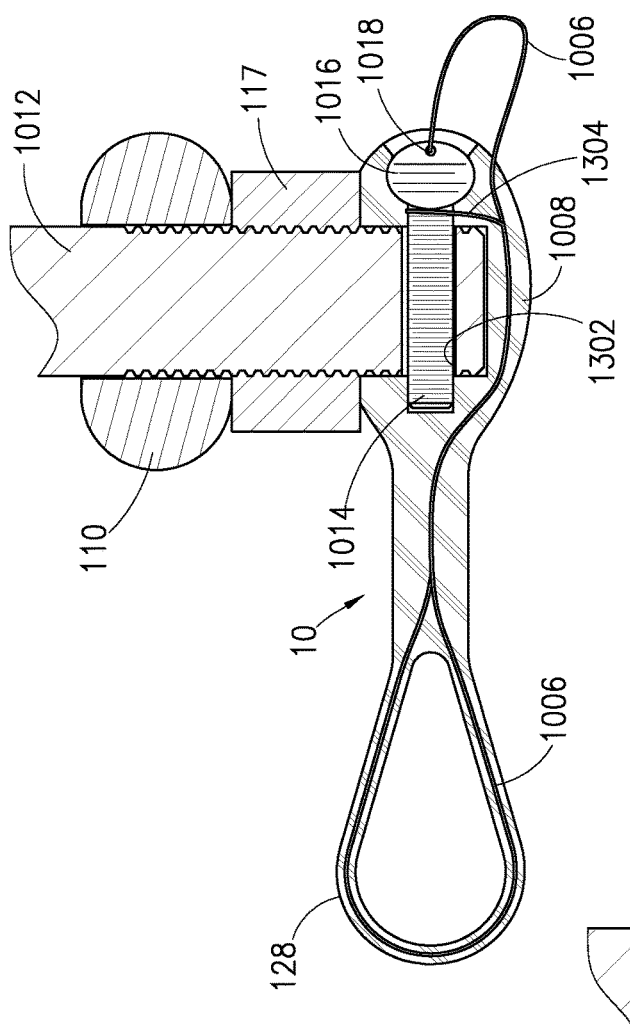
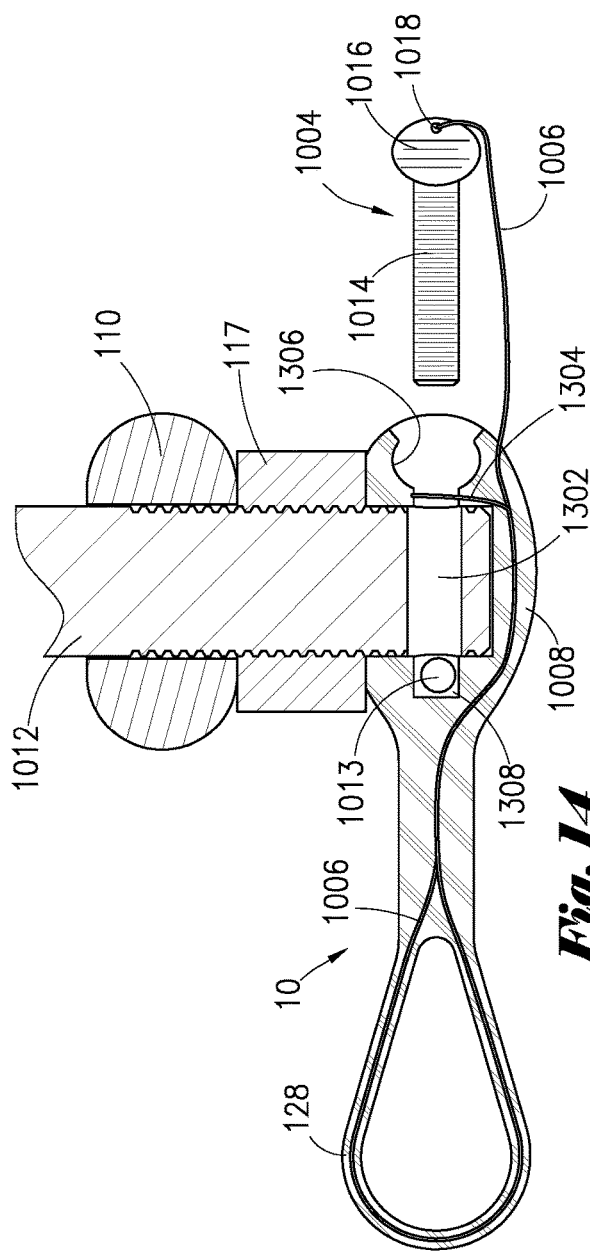

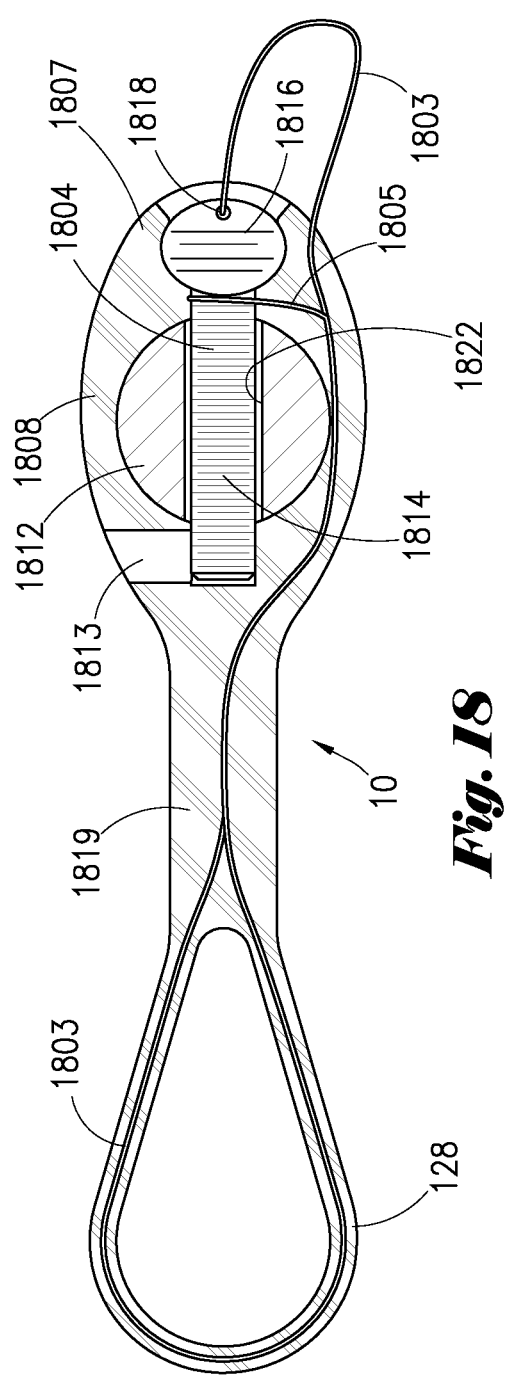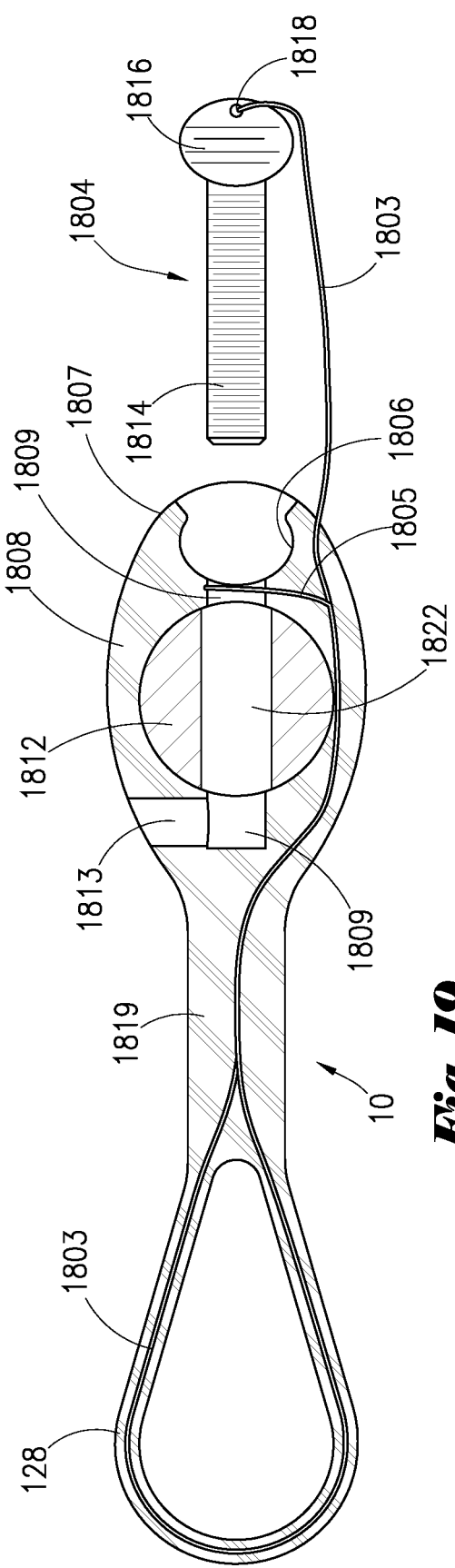

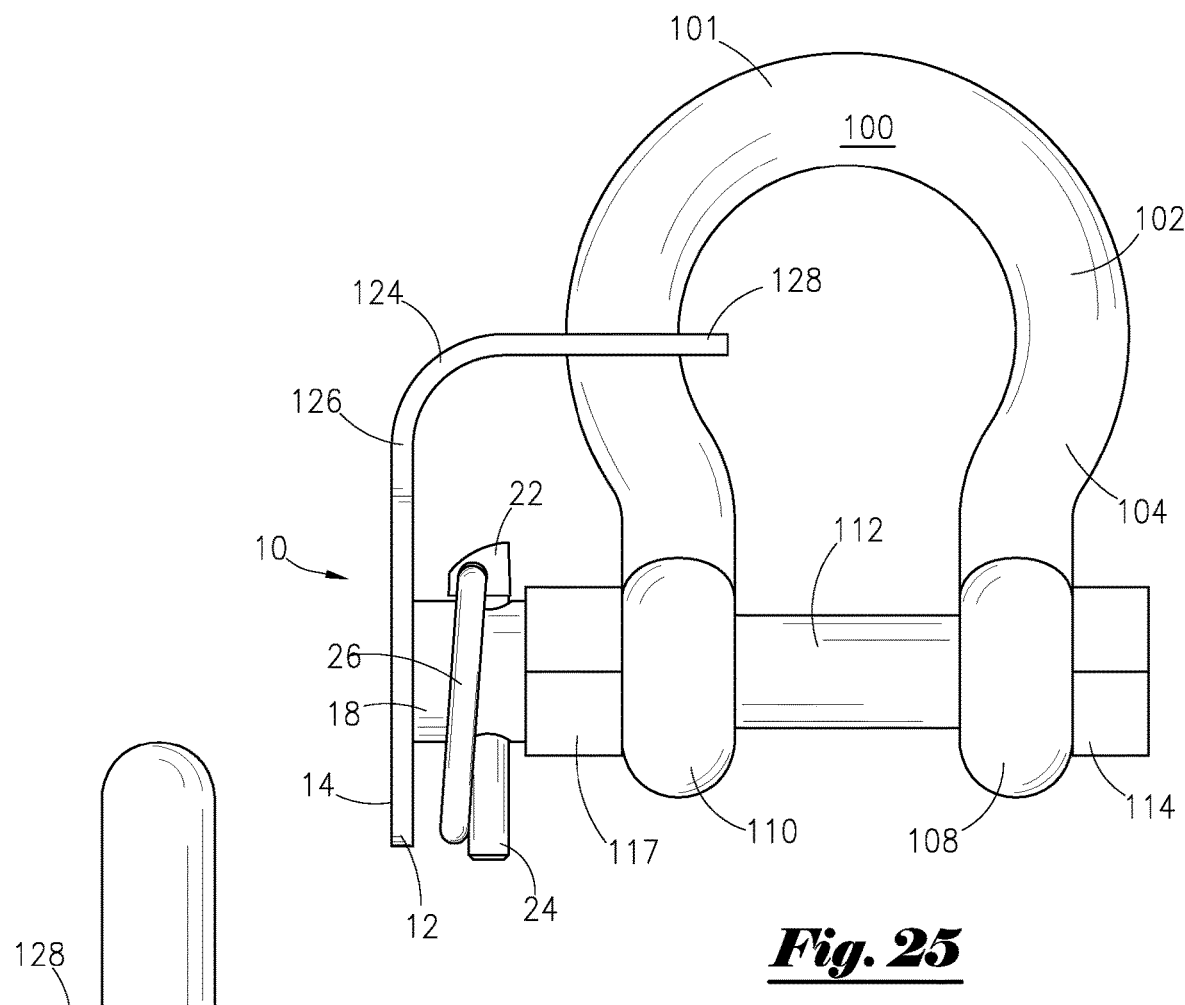
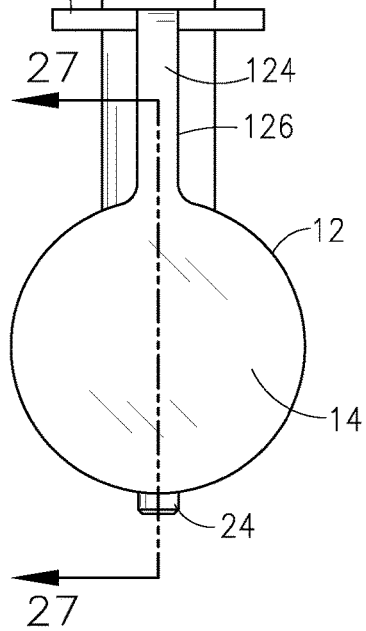
*Fig. 26*
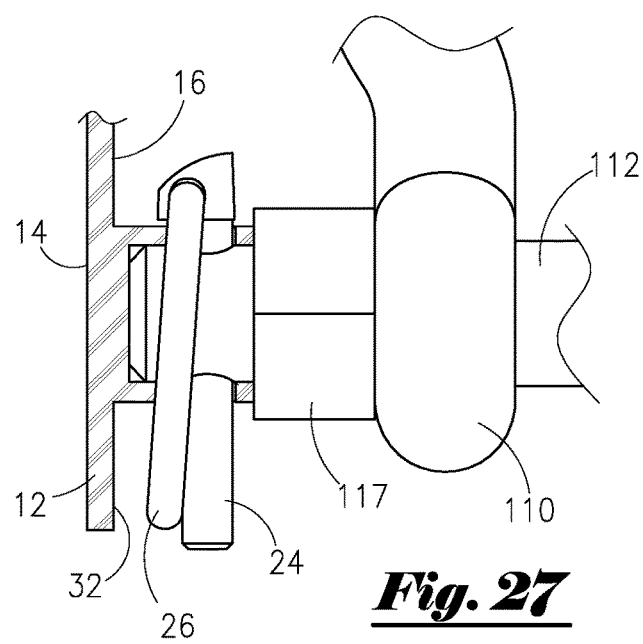
*Fig. 27*

SHACKLE CLAMP ASSEMBLY

CROSS-REFERENCE TO RELATED APPLICATIONS

This application claims the benefit of and priority to U.S. Provisional Patent Application No. 62/839,232, filed on Apr. 26, 2019, which is incorporated by reference herein.

BACKGROUND OF THE DISCLOSURE

Shackles are the primary connecting link in all manner of rigging systems as they allow different rigging subsets to be connected or disconnected quickly. A shackle is a U-shaped piece of metal secured with a clevis pin or bolt that passes through openings at the ends of the U-shaped piece. The end of the bolt protruding out of the second opening contains threads. A nut is threaded to the end of the bolt to secure the bolt to the U-shaped piece. A bore or through-bore may extend through the end of the bolt for accommodation of a cotter pin that is inserted therein in order to prevent the nut from threading off the end of the bolt. In some embodiments of shackle bolts, the end protruding from the second opening of the U-shaped piece contains two sections. The first section has an outer diameter consistent with the outer diameter of the remaining portion of the bolt shaft. This first section may contain threads that mate with threads of the nut. The second section may have an outer diameter smaller than the outer diameter of the first section. The second section may not contain threads but does include a bore through the section for accommodation of the cotter pin.

In many instances, shackles are used as part of a lifting or hoisting system. For example, a crane or other lifting mechanism may include a hoisting line, the end of which is attached to a shackle through the U-shaped piece. Items, such as equipment, desired to be hoisted and transported may be directly attached to the shackle by a lifting eye that is aligned with the openings of the U-shaped piece and through which the bolt may extend. Alternatively, the item may have a lifting strap system, the ends of which may be secured to the shackle.

Shackles using cotter pins to retain the nut on the end of the bolt are commonly used on drilling, production and workover rigs in the oil and gas industry. These types of shackles are disadvantaged in that the cotter pin, when removed from the bolt, is separated from the shackle with a tendency to be misplaced. Furthermore, cotter pins may suffer deformation during use and need to be replaced. Also, engagement and disengagement of the bolt from the U-shaped piece to connect equipment or lifting systems requires an operator to carry pliers that are necessary to clamp down on the cotter pin to remove it from the end of the bolt. There may be a disruption in work should the operator forget to carry pliers to remove the cotter pin. Also, the use of pliers presents a safety issue.

Accordingly, there is a need for an improved system to maintains the nut on the end of the shackle bolt end while the shackle is engaged, which does not require the use of cotter pins or pliers to manipulate the cotter pins.

SUMMARY OF THE DISCLOSURE

The present disclosure is directed to a first embodiment of a shackle clamp assembly. This shackle clamp assembly may include a pin. The shackle clamp assembly may include a cap assembly configured for positioning on an end of a shackle bolt attached to a U-shaped shackle. The cap assembly may include an aperture. The aperture may align with a through-bore in the end of the shackle bolt when the cap assembly is positioned thereon. The pin may be dimensioned for insertion into the aperture of the cap assembly and into the through-bore of the shackle bolt to retain the cap assembly thereon. The shackle clamp assembly may include a hanger assembly having first and second ends. The first end of the hanger assembly may be connected to the cap assembly. The second end of the hanger assembly may have a loop. The loop may be dimensioned for positioning the U-shaped shackle there-within.

In another embodiment of the shackle clamp assembly, the cap assembly may contain an inner bore defined by a bore wall. The inner bore of the cap assembly may be dimensioned to receive the end of the shackle bolt.

In yet another embodiment of the shackle clamp assembly, the aperture of the cap assembly may extend through the bore wall.

In yet another embodiment of the shackle clamp assembly, the aperture may comprise two holes contained in the bore wall. The two holes may be in axial alignment.

In yet another embodiment of the shackle clamp assembly, the cap assembly may include an enlarged diameter portion having a front and a rear and an extension portion extending from the rear of the enlarged diameter portion. The extension portion may form the bore wall.

In yet another embodiment of the shackle clamp assembly, the enlarged diameter portion may include an outer lip extending beyond an outer surface of the bore wall of the extension portion.

In yet another embodiment of the shackle clamp assembly, the pin may be configured for retention about the hanger assembly.

In yet another embodiment of the shackle clamp assembly, the cap assembly may be composed of a flexible material. In yet another embodiment of the shackle clamp assembly, the hanger assembly may be composed of a flexible material. The flexible material may be a natural or synthetic rubber.

In yet another embodiment of the shackle clamp assembly, the cap assembly and the hanger assembly may be formed as a unitary component.

The present disclosure is also directed to an alternative embodiment of the shackle clamp assembly. The shackle clamp assembly may include a linchpin having a pin pivotally connected to a ring member. The shackle clamp assembly may include a cap assembly configured for positioning on an end of a shackle bolt attached to a U-shaped shackle. The cap assembly may include an enlarged diameter portion having a front and rear and an extension portion extending from the rear of the enlarged diameter portion. The extension portion may include a bore defined by a bore wall. The inner bore of the extension portion may be dimensioned to receive the end of the shackle bolt when the cap assembly is positioned thereon. The bore wall of the extension portion may include two holes in axial alignment. The two holes may align with a through-bore in the end of the shackle bolt when the cap assembly is positioned thereon. The two holes may each be dimensioned to accommodate the pin when inserted into the through-bore of the shackle bolt to retain the cap assembly thereon. The shackle clamp assembly may include a hanger assembly having first and second ends. The first end may be connected to the cap assembly. The second end may have a loop. The loop may be dimensioned for positioning the U-shaped shackle there-within.

In another embodiment of the alternative shackle clamp assembly, an outer diameter of the enlarged diameter portion maybe larger than an inner diameter of the ring member.

In yet another embodiment of the alternative shackle clamp assembly, the enlarged diameter portion may include an outer lip extending beyond an outer surface of the bore wall of the extension portion.

In yet another embodiment of the alternative shackle clamp assembly, the cap assembly may be composed of a flexible material. In yet another embodiment of the alternative shackle clamp assembly, the hanger assembly may be composed of a flexible material. The flexible material may be a natural or synthetic rubber.

In yet another embodiment of the alternative shackle clamp assembly, the cap assembly and hanger assembly may be formed as a unitary component.

The present disclosure is also directed to an embodiment of a shackle apparatus. The shackle apparatus may include a shackle assembly. The shackle assembly may include a U-shaped shackle, a shackle bolt and a nut. The U-shaped shackle may have two ends. Each end of the U-shaped shackle may contain a bore. The shackle bolt may extend through the bore in each end of the U-shaped shackle. The shackle bolt may have first end and second ends. The second end of the shackle bolt may contain a through-bore. The nut may be threadedly connected to the second end of the shackle bolt to a position behind the through-bore of the shackle bolt. The shackle apparatus may include a shackle clamp assembly. The shackle clamp assembly may include a linchpin, a cap assembly and a hanger assembly. The linchpin may have a pin pivotally connected to a ring member. The cap assembly may be configured for positioning on the second end of the shackle bolt to abut against the nut. The cap assembly may include an enlarged diameter portion having a front and rear and an extension portion extending from the rear of the enlarged diameter portion. The extension portion may include a bore defined by a bore wall. The inner bore of the extension portion may be dimensioned to receive the second end of the shackle bolt when the cap assembly is positioned thereon. The bore wall of the extension portion may include two holes in axial alignment. The two holes may align with the through-bore of the shackle bolt when the cap assembly is positioned thereon. The two holes may each be dimensioned to accommodate the pin when inserted into the through-bore of the shackle bolt to retain the cap assembly thereon. The shackle clamp assembly may include a hanger assembly having first and second ends. The first end of the hanger assembly may be connected to the cap assembly. The second end of the hanger assembly may have a loop. The loop may be dimensioned for positioning the U-shaped shackle there-within.

In another embodiment of the shackle apparatus, an outer diameter of the enlarged diameter portion may be larger than an inner diameter of the ring member.

In yet another embodiment of the shackle apparatus, the enlarged diameter portion may include an outer lip extending beyond an outer surface of the bore wall of the extension portion.

In yet another embodiment of the shackle apparatus, the ring member of the linchpin may be operatively positioned around the bore wall of the extension portion between the outer lip of the enlarged diameter portion and an end of the pin that extends external to the bore wall of the extension portion.

BRIEF DESCRIPTION OF THE DRAWINGS

FIG. 7 is a side view of an embodiment of a shackle clamp assembly.

FIG. 8 is a cross-sectional view of the embodiment of the shackle clamp assembly shown in FIG. 7 with latching assembly inserted into a bore at the end of the shackle bolt.

FIG. 9 is a top view of the embodiment of the shackle clamp assembly shown in FIG. 7.

FIG. 14 is a partial cross-sectional view of an embodiment of the shackle clamp assembly positioned on the end of the shackle bolt with key non-inserted.

FIG. 15 is a partial cross-sectional view of the embodiment of the shackle clamp assembly positioned on the end of the shackle bolt with key inserted.

FIG. 18 is a partial cross-sectional view of the embodiment of the shackle clamp assembly positioned on the end of the shackle bolt with key inserted.

FIG. 19 is a partial cross-sectional view of the embodiment of the shackle clamp assembly positioned on the end of the shackle bolt with key non-inserted.

FIG. 25 is a side view of an embodiment of the shackle clamp assembly positioned on the end of the shackle bolt.

FIG. 26 is a front view of the embodiment of the shackle clamp assembly positioned on the end of the shackle bolt.

FIG. 27 is a cross-sectional view of the embodiment of the shackle clamp assembly positioned on the end of the shackle bolt taken along line 27-27 of FIG. 26.

DETAILED DESCRIPTION OF THE DISCLOSURE

Figure 1:
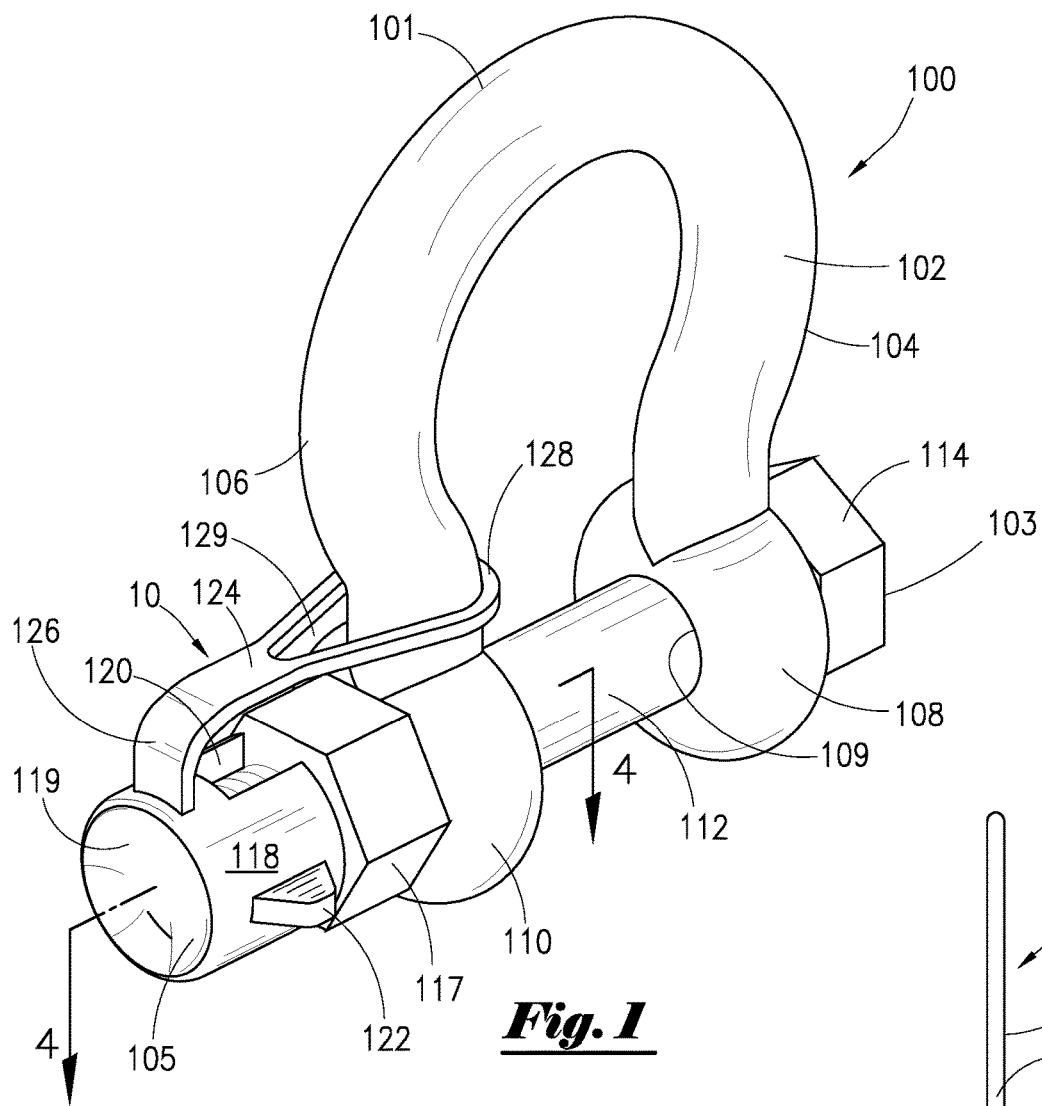
FIG. 1 is a perspective view of an embodiment of the shackle clamp assembly positioned on the end of a shackle bolt.
Figure 2:
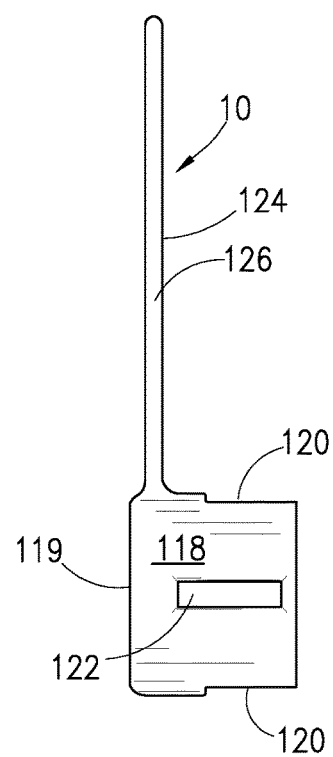
FIG. 2 is a side view of the shackle clamp shown in FIG. 1.
Figure 3:
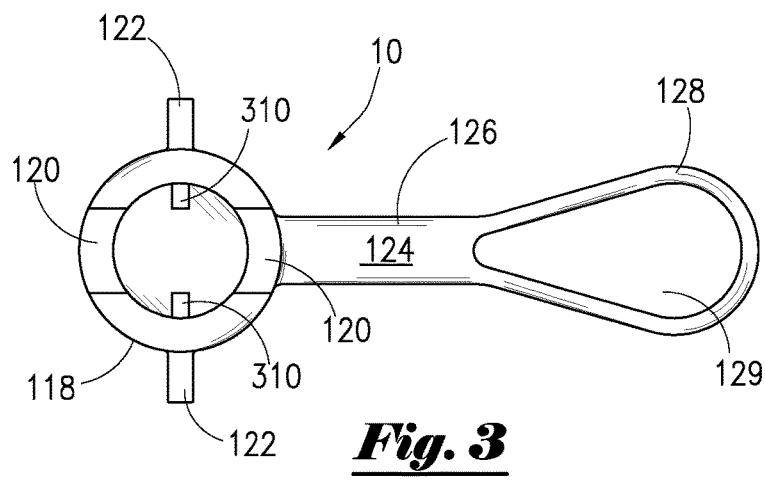
FIG. 3 is a bottom view of the shackle clamp shown in FIG. 1.

As illustrated in FIGS. 1-3, shackle 100 includes U-shaped piece 102, shackle bolt 112 with bolt head 114 and nut 117. U-shaped piece 102 may be made of metal (or other material) and have apex 101, distal arm 104 and proximal arm 106. Distal arm 104 may include distal ring 108 on the end of distal arm 104 and proximal arm 106 may include proximal ring 110 on the end of proximal arm 106.

Figure 11:
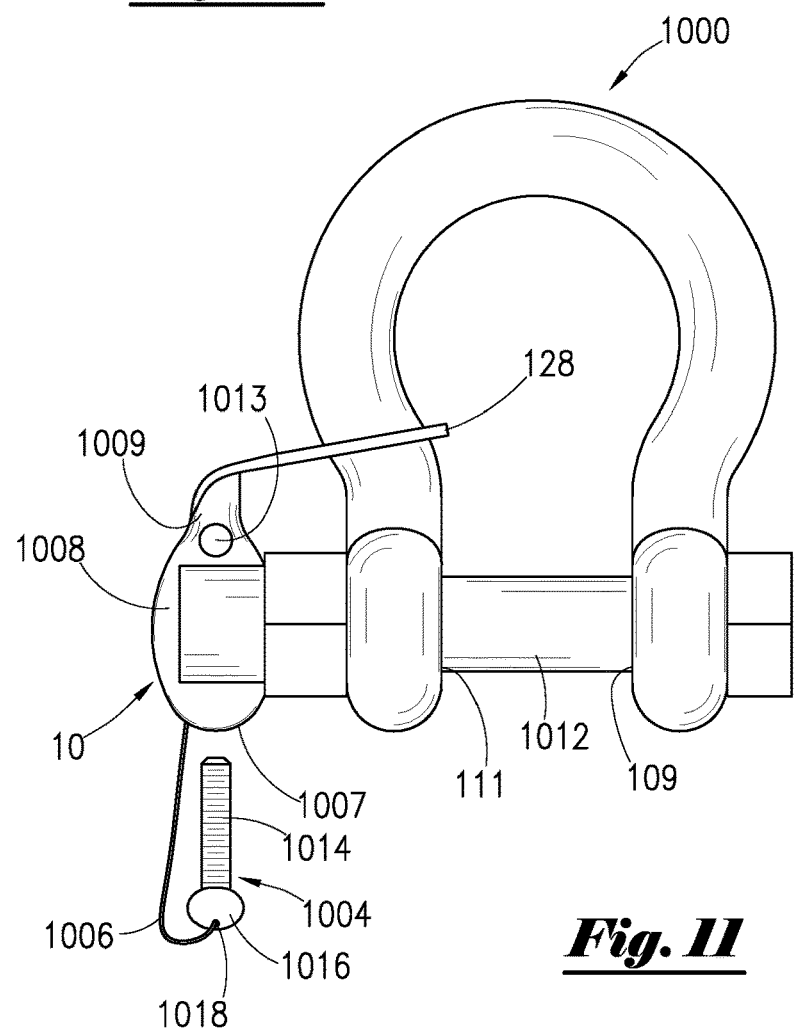
FIG. 11 is a side view of the embodiment of the shackle clamp assembly positioned on the end of the shackle bolt as shown in FIG. 10.

FIGS. 1 and 11 show that shackle bolt 112 may be an elongated piece of metal (or other material) that may extend through and out of apertures 109, 111 respectively, formed within the rings 108, 110. Shackle bolt 112 may be substantially circular shaped in cross-section but may be other shapes. Shackle 100 (or any part thereof) may be many different sizes and is not limited to a particular size range. In some embodiments, shackle bolt 112 may be about ⅞ inch to about 1¼ inches in diameter but may be other sizes. Shackle bolt 112 may include threads at one end. The length of the threaded portion may be about 9/16 inches to about 1 inch but may be other sizes.

Bolt head 114 could also be configured as a distal nut that may be removably-attached (e.g., threadedly-attached) near distal end 103 of the shackle 100 to the end of the shackle bolt 112 on a distal side of the distal ring 108. Nut 117 may be removably-attached (e.g., threadedly-attached) near proximal end 105 of the shackle 100 on shackle bolt 112 on a proximal side of the proximal ring 110. In some embodiments, nut 117 may be a hex nut, be about 1½ inches to about 2¼ inches across at the widest spot and be about ½ inches to about ¾ inches in width. In some embodiments, nut 117 may have other dimensions.

As also shown in FIGS. 1-3, shackle clamp assembly 10 may include cap assembly 118. Cap assembly 118 may attach on proximal end 105 of shackle 100 to the end of shackle bolt 112, such as over the threaded portion on bolt 112. Cap assembly 118 may be composed of polymer, rubber, elastomer, and the like. Cap assembly 118 may include an outwardly facing indention 119 on the proximal end of cap assembly 118. Cap assembly 118 may be cylindrical with a closed proximal end at indention 119 and may have an open-end facing nut 117. Cap assembly 118 may include one or more cutouts 120 on the outer surface of the cap assembly 118. Cutouts 120 may be formed on opposite sides of the cap assembly 118 (FIG. 2). Cap assembly 118 may include one or more flaps 122 extending out from the outer surface of cap assembly 118. Flaps 122 may be formed on opposite sides of cap assembly 118 (FIG. 2).

Again with reference to FIGS. 1-3, cap assembly 118 may connect to hanger assembly 124, which may be composed of polymer, rubber, elastomer, and the like. In some embodiments, cap assembly 118 and hanger assembly 124 may be formed as an integral unit. Hanger assembly 124 may include hanger body 126 and loop 128. Hanger body 126 may attach to cap assembly 118 in between the proximal end of cap assembly 118 and cutout 120. Hanger body 126 may extend out from cap assembly 118 and loop 128 may be formed at an opposite end of hanger assembly 124.

With further reference to FIGS. 1-3, loop 128 may have gap 129 and may fit around a lower portion of proximal arm 106 above ring 110 and shackle bolt 112. Gap 129 may be a shape that may correspond, form, and/or deform to the shape of proximal arm 106. For example, gap 129 may be substantially needle-eye shaped, oval, circular, and the like. As shown in FIG. 2, hanger assembly 124 may include one or more inwardly extending arms 310, which may be part of a latch (described below) included in hanger assembly 124. In some cases, cap assembly 118 and hanger assembly 124 may be brightly colored, such as being colored orange.

Figure 4:
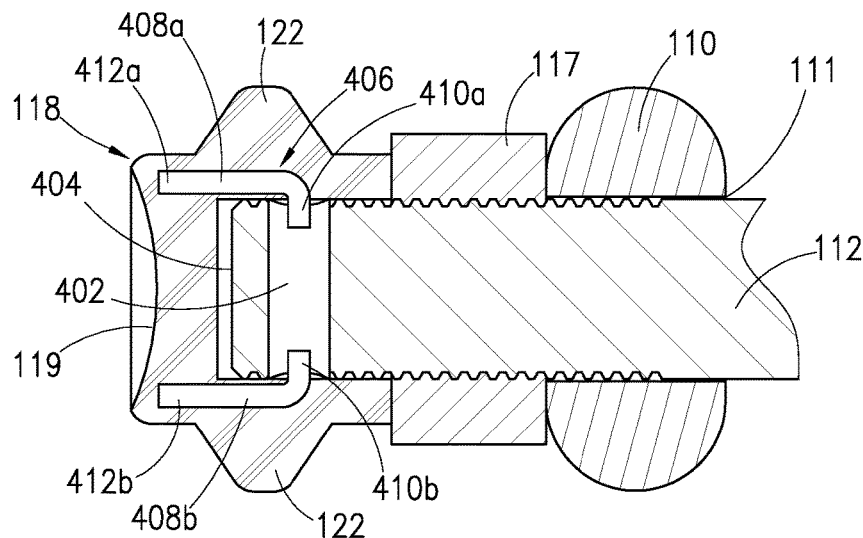
FIG. 4 is a cross-sectional view of an embodiment of the shackle clamp assembly with an L-shaped latching assembly inserted into the bore at the end of the shackle bolt taken along line 4-4 of FIG. 1.

FIG. 4 illustrates an embodiment of the cap assembly 118 in a latched position having a latch 406 comprised of two L-shaped pieces, upper portion 408a and lower portion 408b, which may be detached from each other and located near proximal end 105. Upper portion 408a and lower portion 408b may be formed on opposite sides of cap assembly 118. Upper portion 408a may include leg piece 412a being elongated in a horizontal direction (i.e., in the elongated direction of shackle bolt 112) and terminating before the terminal proximal end of cap assembly 118. Upper portion 408a may include arm piece 410a unitarily formed with leg piece 412a. Arm piece 410a may extend in bore 402 formed in the proximal end of shackle bolt 112 between a more distal portion of shackle bolt 112 and a more proximal terminal end 404 of shackle bolt 112. Bore 402 may have an inner diameter of about 3/16 inch to about 5/16 inch but may be other sizes.

As seen in FIG. 4, lower portion 408b may include leg piece 412b being elongated in a horizontal direction and terminating before the terminal proximal end of cap assembly 118. Lower portion 408b may include arm piece 410b unitarily formed with leg piece 412b. Arm piece 410b may extend in a bore 402 formed in the proximal end of shackle bolt 112 between a more distal portion of shackle bolt 112 and a more proximal terminal end 404 of bolt 112.

In a latched configuration, as shown in FIG. 4, cap assembly 118 may be locked into place about shackle bolt 112 via arms 410a, 410b being extended in bore 402. In this configuration, cap assembly 118 may abut nut 117 to prevent nut 117 from being threadedly disconnected from shackle bolt 112. In a non-latched configuration, portions 408a and 408b may be moved outward (i.e., arms 410a, 410b being moved up and down, respectively, as shown) to unlock cap assembly 118 from shackle bolt 112. For example, arms 410a, 410b may be moved out of the horizontal plane of shackle bolt 112 to allow cap assembly 118 to be moved on or off the end of bolt 112. In some embodiments, movement of portions 408a and 408b outward and inward may be accomplished via grasping and moving corresponding flaps 122, which may be coupled to corresponding portion 408a, 408b. In some embodiments, portions 408a and 408b may be spring-action pieces that may move inward and outward via a spring mechanism. For example, portions 408a and 408b may be spring rods.

Figure 5:
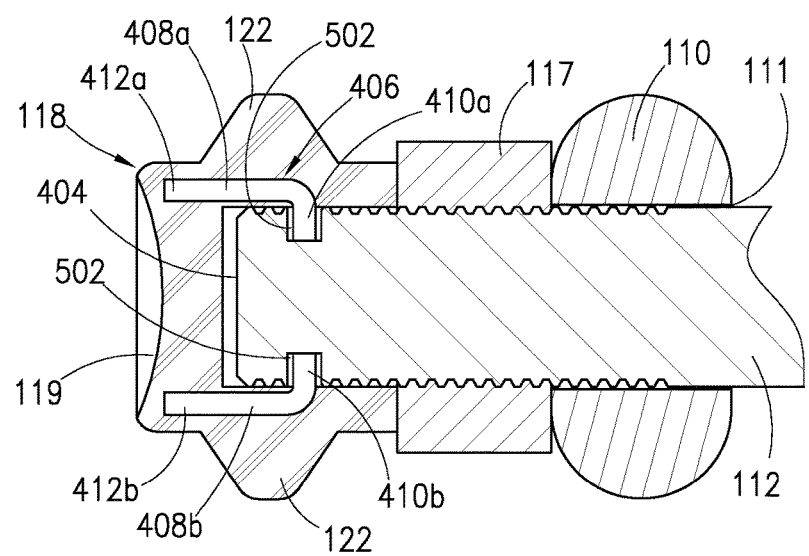
FIG. 5 is a cross-sectional view of an embodiment of the shackle clamp assembly with an L-shaped latching assembly inserted into a groove at the end of the shackle bolt.

FIG. 5 illustrates an embodiment of cap assembly 118 in a latched position having latch 406 comprised of two L-shaped pieces. In the embodiment of FIG. 5, instead of a bore 402, as in FIG. 4, shackle bolt 112 may include one or more grooves 502 that might not extend through shackle bolt 112. Grooves 502 may be formed in the proximal end of shackle bolt 112 between a more distal portion of shackle bolt 112 and a more proximal terminal end 404 of shackle bolt 112. In one embodiment, groove 502 may be a circular groove continuously formed in the perimeter of shackle bolt 112. In one embodiment, grooves 502 may be discontinuously formed in the perimeter of shackle bolt 112. The depth of grooves 502 may accommodate the entry of arms 410a, 410b to sufficiently lock cap assembly 118 in place on bolt 112 when arms 410a, 410b are in a latched configuration.

Figure 6:
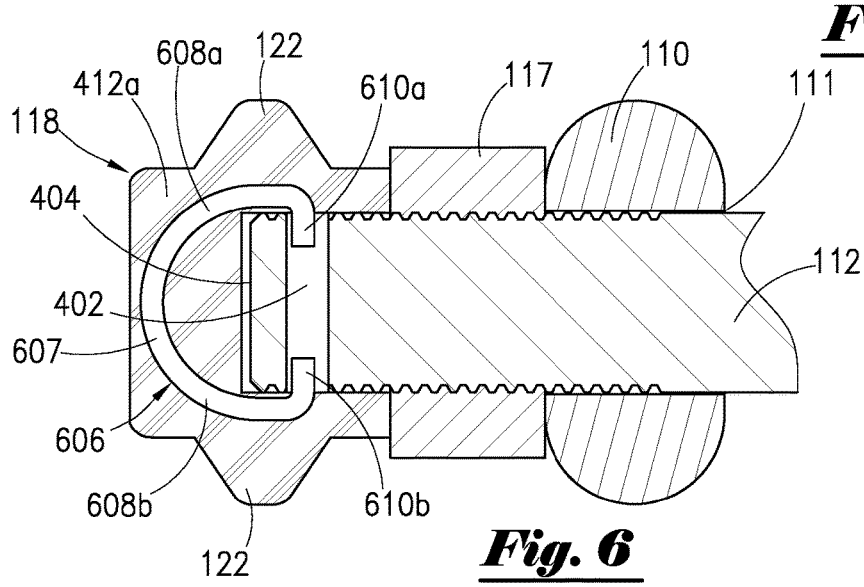
FIG. 6 is a cross-sectional view of an embodiment of the shackle clamp assembly with a U-shaped latching assembly inserted into the bore at the end of the shackle bolt.

FIG. 6 illustrates an embodiment of the cap assembly 118 in a latched position having latch 606 being a single U-shaped piece. Latch 606 may include U-body portion 607 extending around terminal end 404 of shackle bolt 112. U-body portion 607 may include two portions 608a and 608b formed on opposite ends of U-body portion 607. Latch 606 may include two arm pieces 610a, 610b, each being unitarily formed at opposite ends of U-body portion 607. Two arm pieces 610a, 610b may extend in a bore 402 formed in the proximal end of shackle bolt 112 between a more distal portion of shackle bolt 112 and a more proximal terminal end 404 of bolt 112.

In a latched configuration, as shown in FIG. 6, cap assembly 118 may be locked into place on bolt 112 via arms 610a, 610b being extended in bore 402. In a non-latched configuration, arms 610a, 610b may be moved outward (i.e., arms 610a, 610b being moved up and down, respectively) to unlock cap assembly 118 from shackle bolt 112. For example, arms 610a, 610b may be moved out of the horizontal plane of shackle bolt 112 to allow cap assembly 118 to be moved on or off the end of shackle bolt 112. In some embodiments, movement of portions 608a and 608b outward and inward may be accomplished via grasping and moving corresponding flaps 122, which may be coupled to corresponding portion 608a, 608b. In some embodiments, portions 608a and 608b may be spring-action pieces that may move inward and outward via a spring mechanism. For example, portions 608a and 608b may be spring rods. In some embodiments, U-shaped latch 606 may be used in conjunction with one or more grooves 502, such as shown in FIG. 5 and described above, to lock and unlock cap assembly 118 on and off shackle bolt 112.

FIGS. 7-9 illustrate an embodiment of shackle clamp assembly 10 having an end of hanger body 126 (attachment portion 812) attached to the circular end of cap assembly 118. FIG. 7 illustrates a side view of hanger assembly 124 having shoulders 130.

FIG. 8 illustrates an embodiment of cap assembly 118 in a latched position having latch 806 comprised of two arm pieces 810a, 810b having receptive tab ends 807a, 807b. FIG. 9 illustrates a top view of the shackle clamp (cap assembly 118 and hanger assembly 124) having latch 806 showing arms 810a, 810b extending into the internal space inside of cap assembly 118. As shown, two arm pieces 810a, 810b may extend in opposite directions into bore 402 of shackle bolt 112. Two arm pieces 810a, 810b may extend in bore 402 formed in the proximal end of shackle bolt 112 between a more distal portion of shackle bolt 112 and a more proximal terminal end 404 of shackle bolt 112. In a latched configuration, as shown in FIG. 8, cap assembly 118 may be locked into place on bolt 112 via arms 810a, 810b being extended in bore 402. In a non-latched configuration, arms 810a, 810b may be moved outward (i.e., arms 810a, 810b being moved up and down, respectively) to unlock cap assembly 118 from shackle bolt 112. For example, arms 810a, 810b may be moved out of the horizontal plane of bolt 112 to allow cap assembly 118 to be moved out on or off of bolt 112. In some embodiments, movement of arms 810a, 810b outward and inward may be accomplished via grasping and moving corresponding flaps 122, which may be coupled to corresponding tab 807a, 807b. In some embodiments, flaps 122 may have a shape that may be the same and/or correspond to the shape of tab 807a, 807b. In some embodiments, arms 810a, 810b may be spring-action pieces that may move inward and outward via a spring mechanism. For example, arms 810a, 810b may be spring rods. In some embodiments, latch 806 may be used in conjunction with one or more grooves 502, such as shown in FIG. 5 and described above, to lock and unlock cap assembly 118 about shackle bolt 112. As shown, hanger assembly 124 may have attachment portion 812 for attaching to the end of cap assembly 118.

Figure 10:
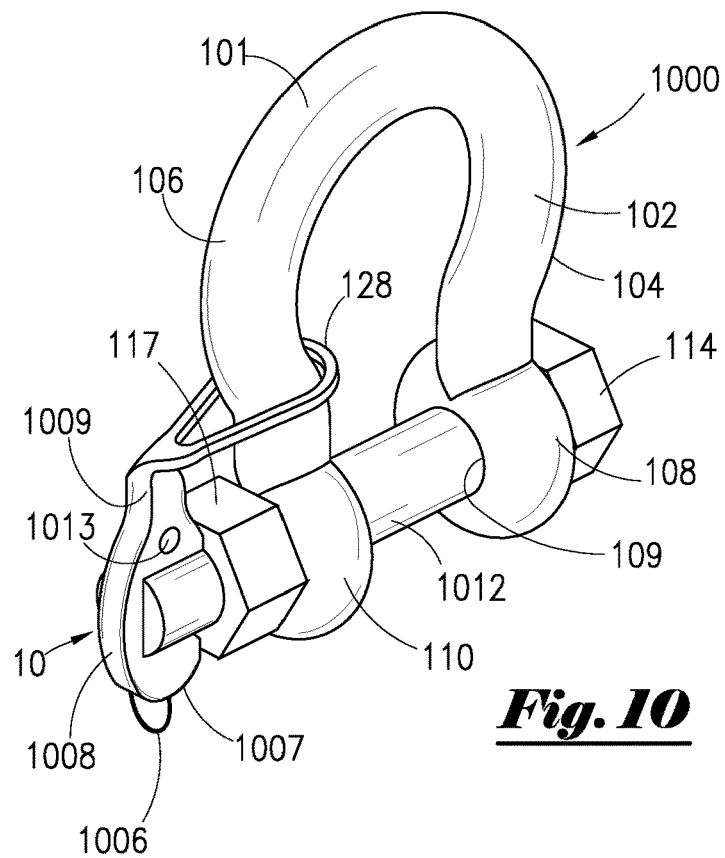
FIG. 10 is a perspective view of an embodiment of the shackle clamp assembly positioned on the end of the shackle bolt.
Figure 12:
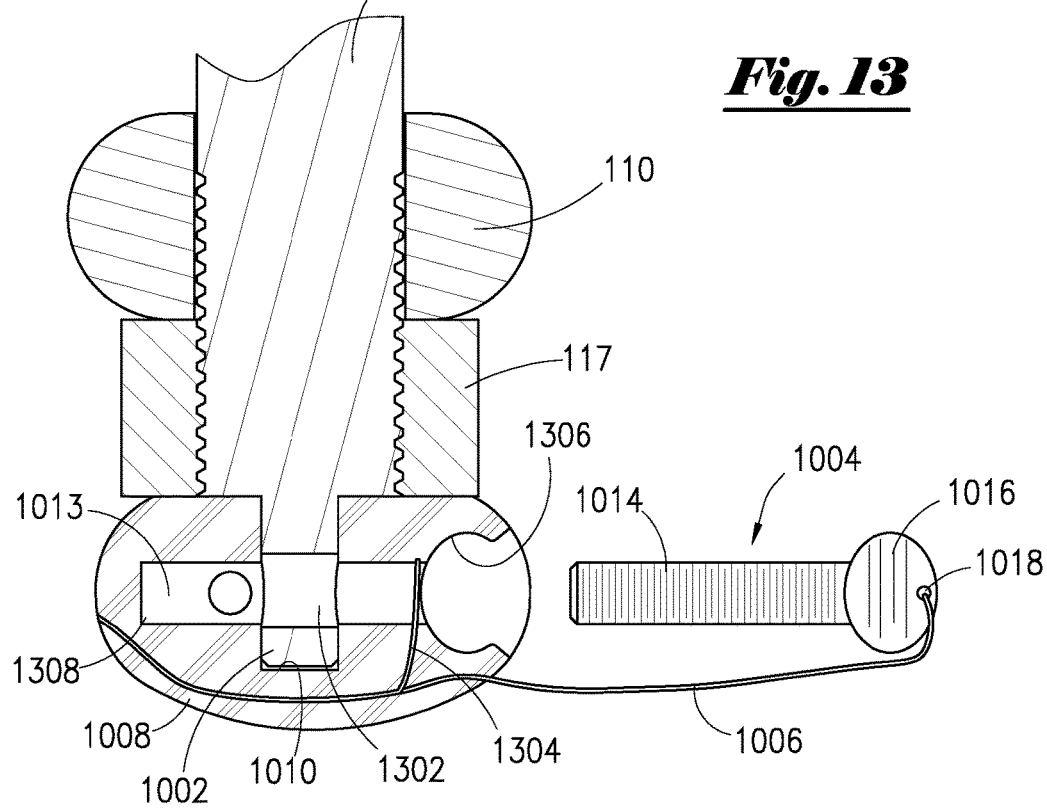
FIG. 12 is a partial cross-sectional view of the embodiment of the shackle clamp assembly positioned on the end of the shackle bolt as shown in FIG. 10 with key non-inserted.

FIG. 10-12 illustrate another embodiment of shackle clamp assembly 10. Shackle bolt 1012 may be an elongated piece of metal that may extend through and out of rings 108, 110. Shackle bolt 1012 may be substantially circular shaped in cross section but may have other shapes. Shackle bolt 1012 may include a projection 1002 at the proximal end of shackle bolt 1012 on the proximal side of nut 117.

Figure 13:
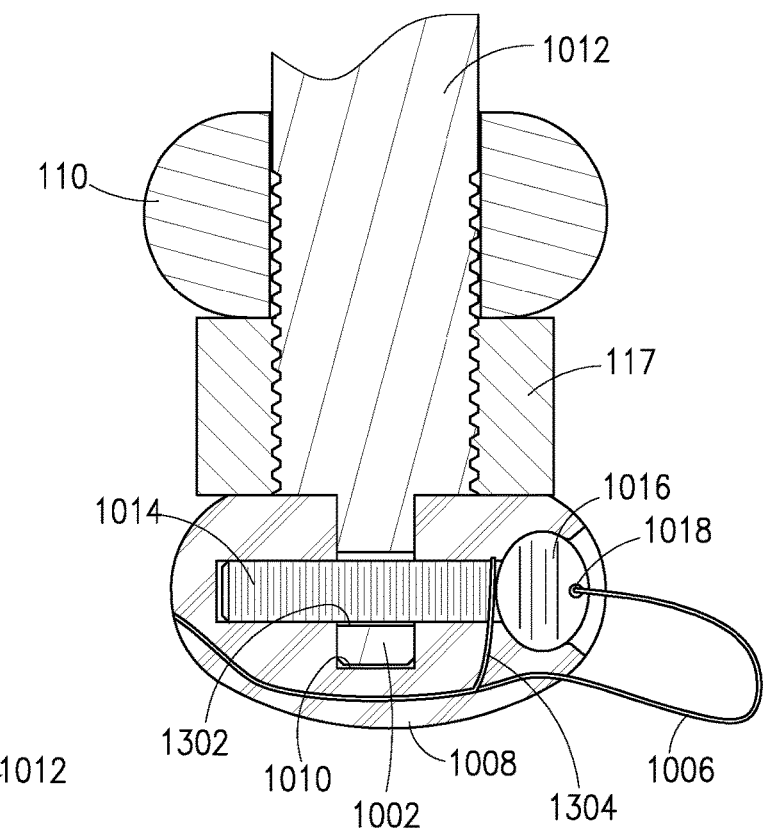
FIG. 13 is a partial cross-sectional view of the embodiment of the shackle clamp assembly positioned on the end of the shackle bolt as shown in FIG. 10 with key inserted.

With reference to FIGS. 12-13, projection 1002 may be about 7/16 inches to about ½ inches in length but may be other sizes. In some embodiments, the diameter of projection 1002 may be smaller than the diameter of the more distal portion of bolt 1002. For example, projection 1002 may have a diameter of about 11/16 inches to about 7/8 inches, and the more distal portion of bolt 1002 may have a diameter of 7/8 inches, but other sizes are possible. In some embodiments, the diameter of projection 1002 may be equal to the diameter of more distal portion of bolt 1002.

As seen in FIGS. 10-13, key receiving cap member 1008 may extend around projection 1002 and abut against the proximal end of nut 117. Key receiving cap member 1008 may be composed of polymer, rubber, elastomer, and the like. Key receiving cap member 1008 may be disc-shaped and may have protrusion 1009 extending from one side of key receiving cap member 1008.

Again with reference to FIGS. 10-13, protrusion 1009 may be formed opposite to bottom side 1007 of key receiving cap member 1008. Projection 1002 may fit inside of cutout 1010 of key receiving cap member 1008, where cutout 1010 may be formed between protrusion 1009 and bottom side 1007 of key receiving cap member 1008. Bottom side 1007 may have an opening that may fit key 1004, which may be attached to cable 1006. Protrusion 1009 may include hole 1013. The end of protrusion 1009 may connect to rubber loop 128.

FIGS. 11-15 illustrate that key 1004 may have elongated key body 1014, a key head 1016 at one end of key body 1014, and aperture 1018 formed through key head 1016. Cable 1006 may extend through aperture 1018 and inside of key receiving cap member 1008 at bottom side 1007. A portion of cable 1006 may be molded inside of cap member 1008. Cable 1006 may act to keep key receiving cap member 1008 from being cut off. Bottom side 1007 may include key head cutout 1306 that may be configured to receive key 1004 and fit key head 1016.

As also shown in FIGS. 12 and 13, shackle bolt 1012 may include an internal channel 1302 within projection 1002 in alignment with cutout 1306 up to hole 1013 on protrusion 1009. In some embodiments, there may be one or more channels 1308 connecting between cutout 1306, channel 1302, and hole 1013. Cable 1006 may extend through key receiving cap member 1008 and form a loop in loop 128 that may have a shape corresponding to the shape of loop 128. Safety cable 1304 may extend from cable 1006 up around channel 1308 formed between key head cutout 1306 and channel 1302. Safety cable 1304 may be molded inside of cap member 1008. Safety cable 1304 may act to secure key 1004 when it is inserted into key receiving cap member 1008.

FIGS. 12-15 depict that shackle clamp assembly 10 may be configured in locked and unlocked positions. To transition from the unlocked position (FIGS. 12 and 14) to the locked position (FIGS. 13 and 15), key 1004 may be inserted through key head cutout 1306, into channel 1302, and into channel 1308 formed below hole 1013, as shown. In the locked position, key 1004 may be located inside of bolt 1012 in projection 1002 (through channel 1302).

Figure 16:
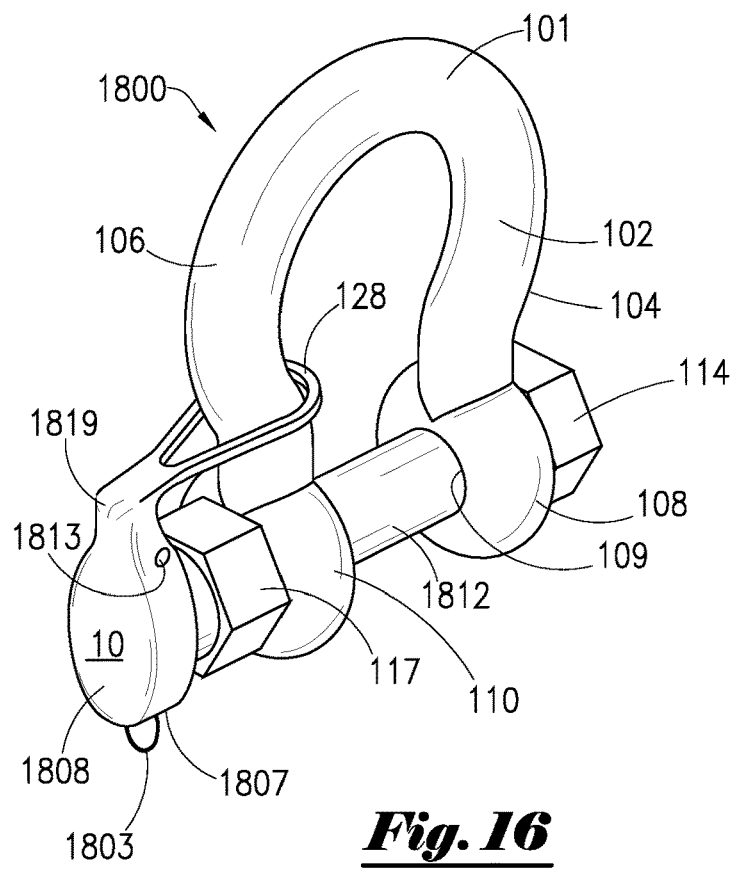
FIG. 16 is a perspective view of an embodiment of the shackle clamp assembly positioned on the end of a shackle bolt.
Figure 17:
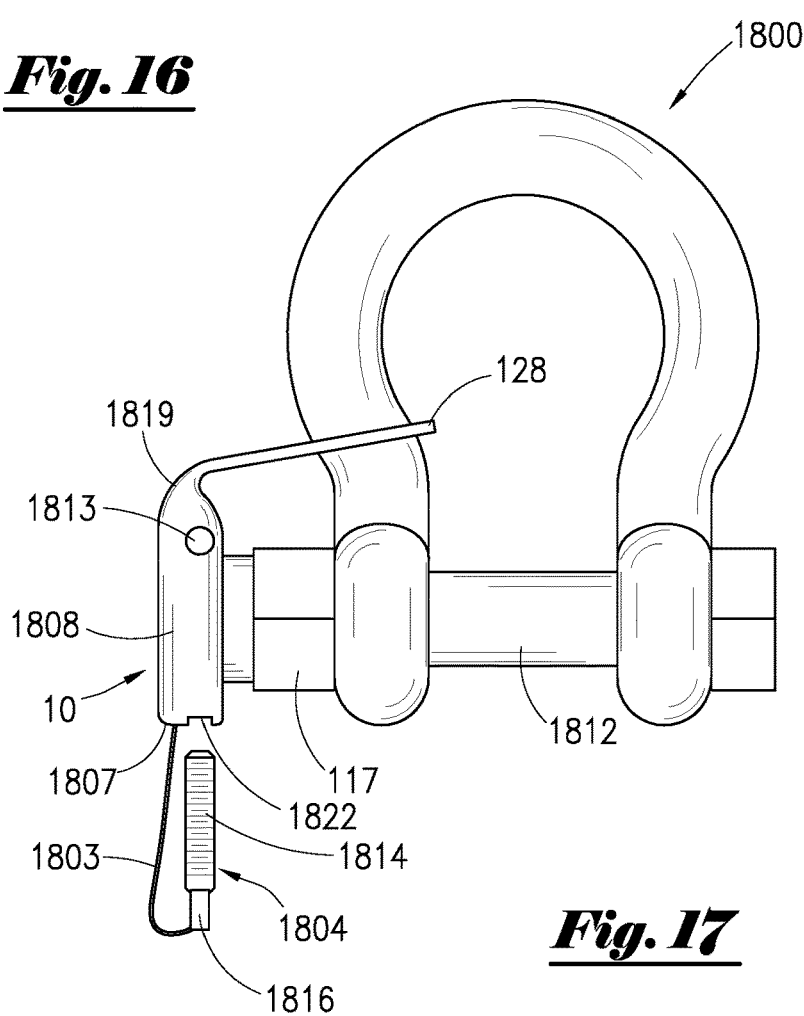
FIG. 17 is a side view of the embodiment of the shackle clamp assembly positioned on the end of the shackle bolt as shown in FIG. 16 with key non-inserted.

FIGS. 16 and 17 illustrate that shackle bolt 1812 may be an elongated piece of metal that may extend through and out of the rings 108, 110. Bolt 1812 may be substantially circular shaped in cross section but may have other shapes.

Within reference to FIGS. 16 and 17, cap member 1808 may be composed of polymer, rubber, elastomer, and the like. Cap member 1808 may have hollow cylinder shape being closed at the proximal end and open at the distal end of cap member 1808. Cap member 1808 may have a protrusion 1819 extending from one side of cap member 1808. Protrusion 1819 may be formed opposite to bottom side 1807 of cap member 1808.

FIGS. 17-19 illustrate that bottom side 1807 may have an opening that may fit key 1804, which may be attached to cable 1803. Protrusion 1819 may include hole 1813. The end of protrusion 1819 may connect to rubber loop 128.

Again with reference to FIGS. 16 and 17, key 1804 may have elongated key body 1814, key head 1816 at one end of key body 1814, and aperture 1818 formed through key head 1816. Cable 1803 may extend through aperture 1818 and inside of shackle cap member 1808 at bottom side 1807. The shackle clamp may be configured in locked and unlocked positions. To transition from the unlocked position to the locked position, key 1804 may be inserted through one or more channels which may extend through cap member 1808 and bolt 1812 up to hole 1813. In the locked position, key 1804 may be located inside of bolt 1812 between a terminal proximal end of bolt 1812 and a more distal portion of bolt 1812.

FIGS. 18 and 19 illustrate that key 1804 may have elongated key body 1814, key head 1816 at one end of key body 1814, and aperture 1818 formed through key head 1816. Cable 1803 may extend through aperture 1818 and inside of key receiving cap member 1808 at bottom side 1807. Portion of cable 1803 may be molded inside of cap member 1808. Cable 1803 may act to keep the key receiving cap member 1808 from being cut off.

As seen in FIGS. 18 and 19, bottom side 1807 may include key head cutout 1806 that may be configured to receive key 1804 and fit key head 1816. Shackle bolt 1812 may include internal channel 1822 extending from cutout 1806 up to hole 1813 on protrusion 1819. In some embodiments, there may be channels 1809 connecting between cutout 1806, channel 1822, and hole 1813. To transition from the unlocked position (FIG. 19) to the locked position (FIG. 18), key 1804 may be inserted through key head cutout 1806, into channel 1822, and into channel 1809 formed below hole 1813, as shown. In the locked position, key 1804 may be located inside of bolt 1812 in projection 1802 between a terminal end of bolt 1812/projection 1802 and a more distal portion of bolt 1812.

With further reference to FIGS. 18 and 19, cable 1803 may extend through key receiving cap member 1808 and form a loop in loop 128 that has a shape corresponding to the shape of loop 128. Safety cable 1805 may extend from cable 1803 up around channel 1809 formed between key head cutout 1806 and channel 1822. Safety cable 1805 may be molded inside of cap member 1808. Safety cable 1805 may act to secure key 1804 when it is inserted into key receiving cap member 1808.

Figure 20:
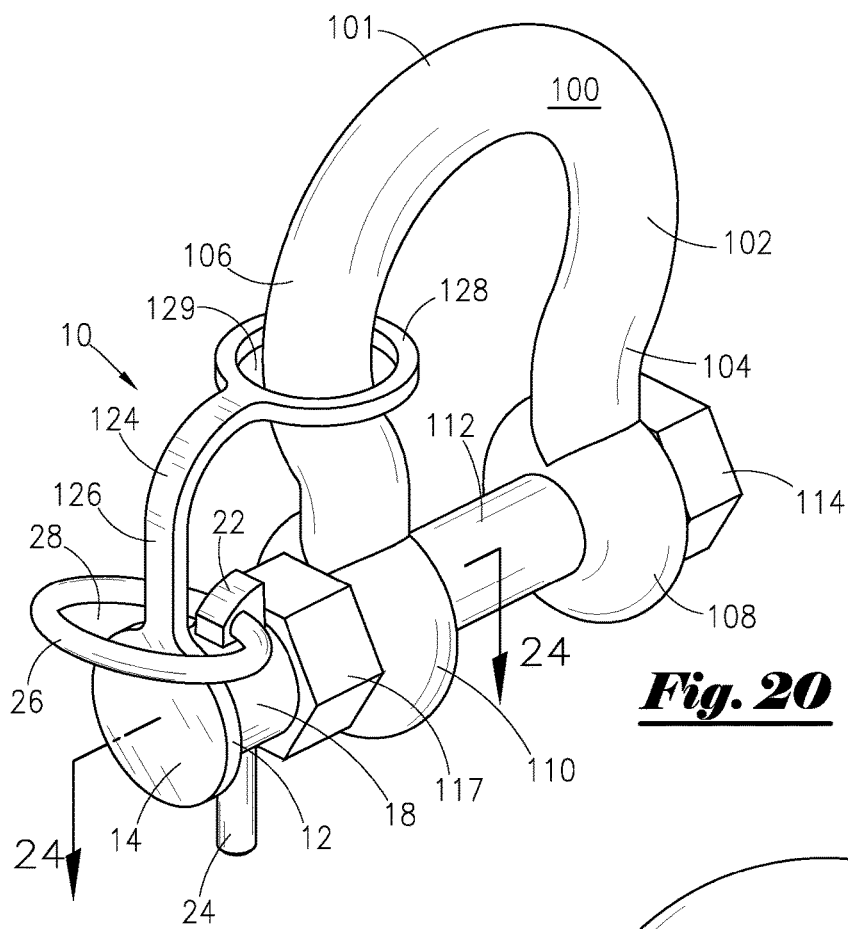
FIG. 20 is a perspective view of an embodiment of the shackle clamp assembly positioned on the end of the shackle bolt.
Figure 21:
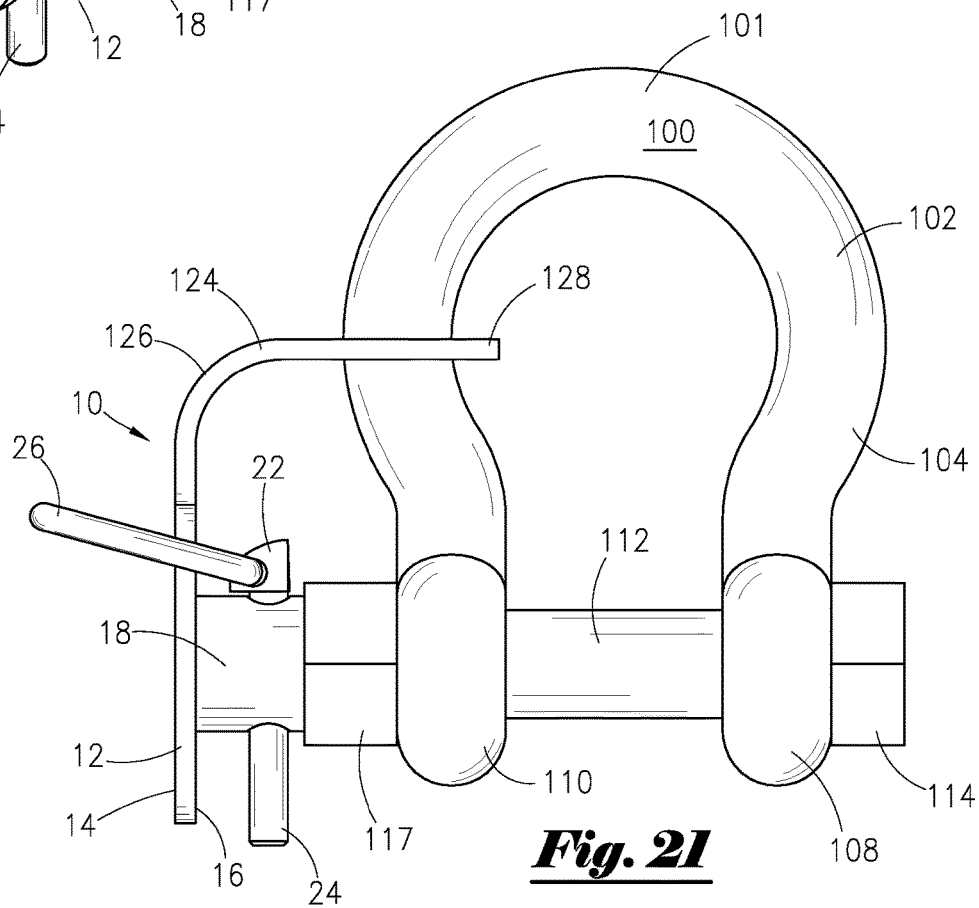
FIG. 21 is a side view of the embodiment of the shackle clamp assembly positioned on the end of the shackle bolt as shown in FIG. 20.

FIGS. 20-27 illustrate yet another embodiment of shackle clamp assembly 10. As seen in FIGS. 20 and 21, this embodiment of shackle clamp assembly 10 may include clamp assembly 118 containing enlarged diameter portion 12 having front 14 and rear 16. Extension portion 18 extends from rear 16 and includes inner bore 20 dimensioned to receive terminal end 404 of shackle bolt 112. Shackle clamp assembly may also include linchpin 22 including pin 24 and ring 26. Ring 26 may be dimensioned so as to be retained on clamp assembly 118 and hanger assembly 124 by having an inner diameter in bore 28 that is smaller than the outer diameter of enlarged diameter portion 12. Therefore, linchpin 22 will stay retained between cap assembly 118 and loop 128 (which is engaged around shackle 100) unless a user applies sufficient force so as to pull cap assembly 118 (enlarged diameter portion 12 and extension portion 18) through ring 26.

Figure 22:
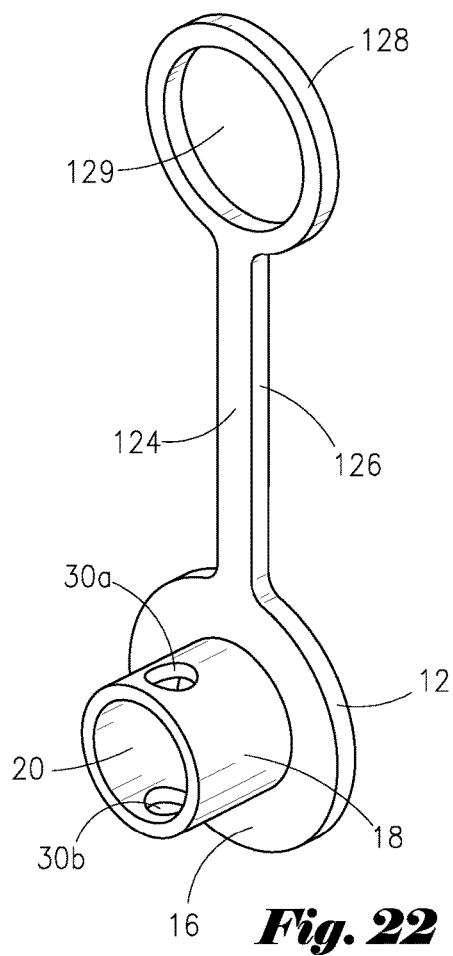
FIG. 22 is a perspective view of the embodiment of the shackle clamp assembly.
Figure 23:
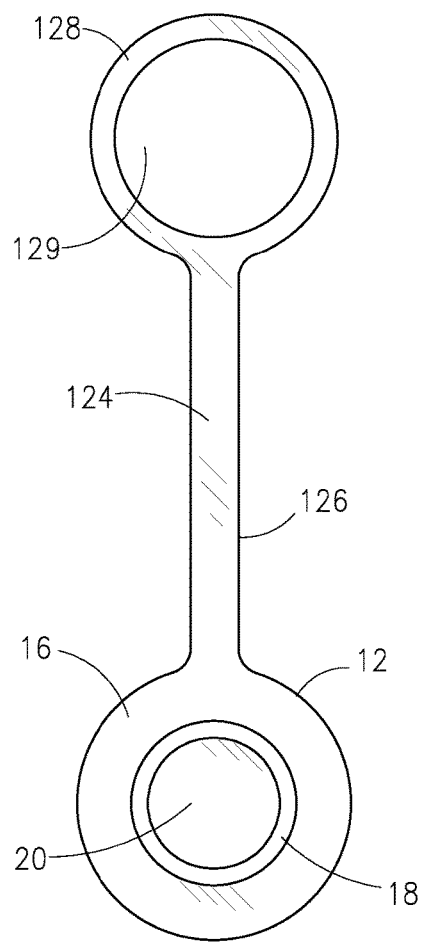
FIG. 23 is a bottom view of the shackle clamp assembly shown in FIG. 22.

With reference to FIGS. 22 and 23, extension portion 18 may include holes 30a and 30b in axial alignment.

Figure 24:
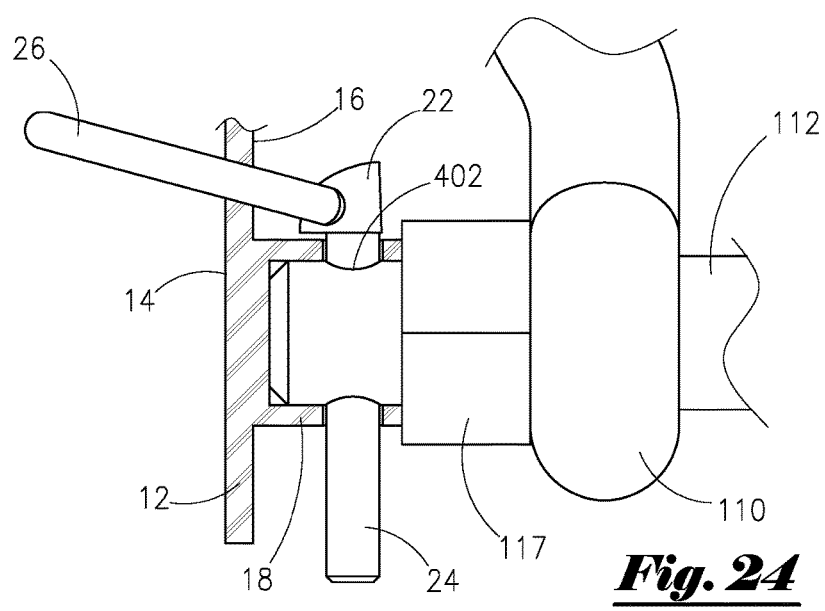
FIG. 24 is a cross-sectional view of the embodiment of the shackle clamp assembly positioned on the end of the shackle bolt taken along line 24-24 of FIG. 20.

FIG. 24 depicts pin 24 extending through hole 30a in extension portion 18, bore 402 in the proximal end of shackle bolt 112, and hole 30b in extension portion 18 to lock cap assembly 118 in place on the end of shackle bolt 112 to prevent unthreading of nut 117.

FIGS. 25-27 show an alternative arrangement of ring 26 when pin 24 is positioned in the end of shackle bolt 112. Ring 26 has been pivoted in the direction of pin 24 to a resting position adjacent to pin 24 such that extension portion 18 is positioned within ring 26. To achieve this position, ring 26 has been forced by a user over enlarged diameter portion 12. Because enlarged diameter portion 12 may have an outer diameter larger than the inner diameter of ring 26, enlarged diameter portion 12 keeps ring 26 from pivoting in the direction away from pin 24 and thus extension portion 18 is maintained within ring 26. For example, ring 26 is retained between lip 32 of enlarged diameter portion 12 and the end of pin 24. The spring action in linchpin 22 may cause ring 26 to pivot away from the end of pin 24 and in the direction of lip 32. Because lip 32 acts as a barrier to which ring may make contact when pivoting away from the end of pin 24, lip 32 prevents ring 26 from pivoting over enlarged diameter portion 12 to retain ring 26 between lip 32 and pin 24, unless a user intentionally applies force to ring 26.

As mentioned previously, cap assembly 118 and hanger assembly 124 may be formed as a unitary component or piece, as for example, by molding. Cap assembly and hanger assembly may be formed of the same material, such as a flexible or stretchable material. For example, the material may be a natural or synthetic rubber. If synthetic rubber is used, additives may be includes such as silicone. The rubber (with or without additives) may have a hardness in the range of 20 to 90 durometers, or 40 to 60 durometers.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%, etc.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A shackle clamp assembly comprising:
    a pin;
    a cap assembly configured for positioning on an end of a shackle bolt attached to a U-shaped shackle, the cap assembly including an aperture, the aperture aligning with a through-bore in the end of the shackle bolt when the cap assembly is positioned thereon, the pin dimensioned for insertion into the aperture of the cap assembly and into the through-bore of the shackle bolt to retain the cap assembly thereon;
    a hanger assembly having first and second ends, the first end connected to the cap assembly, the second end having a loop, the loop dimensioned for positioning the U-shaped shackle there-within; and
    wherein the cap assembly is composed of a flexible material.

2. The shackle clamp assembly of claim 1, wherein the cap assembly contains an inner bore defined by a bore wall, the inner bore of the cap assembly dimensioned to receive the end of the shackle bolt.

3. The shackle clamp assembly of claim 2, wherein the aperture of the cap assembly extends through the bore wall.

4. The shackle clamp assembly of claim 3, wherein the aperture comprises two holes contained in the bore wall, the two holes being in axial alignment.

5. The shackle clamp assembly of claim 4, wherein the cap assembly includes an enlarged diameter portion having a front and a rear and an extension portion extending from the rear of the enlarged diameter portion, the extension portion forming the bore wall.

6. The shackle clamp assembly of claim 5, wherein the enlarged diameter portion includes an outer lip extending beyond an outer surface of the bore wall of the extension portion.

7. The shackle clamp assembly of claim 1, wherein the pin is configured for retention about the hanger assembly.

8. The shackle clamp assembly of claim 1, wherein the hanger assembly is composed of a flexible material.

9. The shackle clamp assembly of claim 8, wherein the flexible material of each of the cap assembly and the hanger assembly is a natural or synthetic rubber.

10. The shackle clamp assembly of claim 1, wherein the cap assembly and the hanger assembly are formed as a unitary component.

11. A shackle clamp assembly comprising:
    a linchpin having a pin pivotally connected to a ring member;
    a cap assembly configured for positioning on an end of a shackle bolt attached to a U-shaped shackle, the cap assembly including an enlarged diameter portion having a front and rear and an extension portion extending from the rear of the enlarged diameter portion, the extension portion including a bore defined by a bore wall, the inner bore of the extension portion dimensioned to receive the end of the shackle bolt when the cap assembly is positioned thereon, the bore wall of the extension portion including two holes in axial alignment, the two holes aligning with a through-bore in the end of the shackle bolt when the cap assembly is positioned thereon, the two holes each dimensioned to accommodate the pin when inserted into the through-bore of the shackle bolt to retain the cap assembly thereon;
    a hanger assembly having first and second ends, the first end connected to the cap assembly, the second end having a loop, the loop dimensioned for positioning the U-shaped shackle there-within; and
    wherein the cap assembly is composed of a flexible material.

12. The shackle clamp assembly of claim 11, wherein an outer diameter of the enlarged diameter portion is larger than an inner diameter of the ring member.

13. The shackle clamp assembly of claim 11, wherein the enlarged diameter portion includes an outer lip extending beyond an outer surface of the bore wall of the extension portion.

14. The shackle clamp assembly of claim 11, wherein the hanger assembly is composed of a flexible material.

15. The shackle clamp assembly of claim 14, wherein the flexible material of each of the cap assembly and the hanger assembly is a natural or synthetic rubber.

16. The shackle clamp assembly of claim 11, wherein the cap assembly and hanger assembly are formed as a unitary component.

17. A shackle apparatus comprising:
    a shackle assembly, the shackle assembly including a U-shaped shackle, a shackle bolt and a nut, the U-shaped shackle having two ends, each end of the U-shaped shackle containing a bore, the shackle bolt extending through the bore in each end of the U-shaped shackle, the shackle bolt having first end and second ends, the second end of the shackle bolt containing a through-bore, the nut threadedly connected to the second end of the shackle bolt to a position behind the through-bore of the shackle bolt; and
    a shackle clamp assembly, the shackle clamp assembly including a linchpin, a cap assembly and a hanger assembly, the linchpin having a pin pivotally connected to a ring member, the cap assembly configured for positioning on the second end of the shackle bolt to abut against the nut, the cap assembly including an enlarged diameter portion having a front and rear and an extension portion extending from the rear of the enlarged diameter portion, the extension portion including a bore defined by a bore wall, the inner bore of the extension portion dimensioned to receive the second end of the shackle bolt when the cap assembly is positioned thereon, the bore wall of the extension portion including two holes in axial alignment, the two holes aligning with the through-bore of the shackle bolt when the cap assembly is positioned thereon, the two holes each dimensioned to accommodate the pin when inserted into the through-bore of the shackle bolt to retain the cap assembly thereon, and a hanger assembly having first and second ends, the first end of the hanger assembly connected to the cap assembly, the second end of the hanger assembly having a loop, the loop dimensioned for positioning the U-shaped shackle there-within, wherein the cap assembly is composed of a flexible material.

18. The shackle apparatus of claim 17, wherein an outer diameter of the enlarged diameter portion is larger than an inner diameter of the ring member.

19. The shackle apparatus of claim 17, wherein the enlarged diameter portion includes an outer lip extending beyond an outer surface of the bore wall of the extension portion.

20. The shackle apparatus of claim 19, wherein the ring member of the linchpin is operatively positioned around the bore wall of the extension portion between the outer lip of the enlarged diameter portion and an end of the pin that extends external to the bore wall of the extension portion.

* * * * *